United States Patent [19]

Nakamura et al.

[11] 4,454,457
[45] Jun. 12, 1984

[54] POWER SUPPLY SYSTEM FOR A LINEAR MOTOR

[75] Inventors: Kiyoshi Nakamura, Katsuta; Masayoshi Isaka, Hitachi; Shigeyoshi Koike, Katsuta, all of Japan

[73] Assignee: Hitachi, Ltd., Tokyo, Japan

[21] Appl. No.: 388,220

[22] Filed: Jun. 14, 1982

[30] Foreign Application Priority Data

Jun. 19, 1981 [JP] Japan .................. 56-95060

[51] Int. Cl.³ ........................... H02K 41/02
[52] U.S. Cl. .................. 318/135; 318/105; 104/292; 310/12
[58] Field of Search .......... 318/135, 105, 106; 310/12-14; 104/290, 292, 294

[56] References Cited

U.S. PATENT DOCUMENTS

| | | | |
|---|---|---|---|
| 3,904,941 | 9/1975 | Matsui et al. | 318/135 |
| 3,912,991 | 10/1975 | Moyse | 318/135 |
| 3,912,992 | 10/1975 | Lamb | 318/135 |
| 3,914,669 | 10/1975 | Holtz | 318/135 |
| 3,960,090 | 6/1976 | Maki et al. | 318/135 |
| 4,013,014 | 3/1977 | Holtz | 318/135 |
| 4,068,152 | 1/1978 | Nakamura et al. | 318/135 |
| 4,348,618 | 9/1982 | Nakamura et al. | 318/135 |
| 4,361,045 | 11/1982 | Gibson | 318/135 |

OTHER PUBLICATIONS

Japanese Railway Eng., vol. 19, No. 1, 1979, p. 10 by Kan-ichiro Kaminishi.

*Primary Examiner*—B. Dobeck
*Assistant Examiner*—A. Evans
*Attorney, Agent, or Firm*—Antonelli, Terry & Wands

[57] ABSTRACT

In a linear motor composed of a propelling coil laid on continuously along a track and a field system mounted on a vehicle for driving it, the propelling coil of an enormous length is sectioned into a number of propelling coil units which are connected alternately to two sets of feeders by means of switches, the feeder sets being supplied with polyphase currents from different power converters, respectively. The propelling coil units are connected in series to one another without any interposed insulation and sectioned by a number of lead conductors so that every pair of the adjacent propelling coil units has a common coil portion shared by them and having a length not smaller than that of the vehicle. A pair of the polyphase lead conductors connected to each of the propelling coil units are connected, respectively, to going feeders and return feeders constituting the set of feeders through switches. Change-over of power supply between the adjacent propelling coil units is performed during a period in which the vehicle is running along the common coil section by closing and opening the associated switches and controlling power converters.

9 Claims, 18 Drawing Figures

POWER SUPPLY SYSTEM FOR A LINEAR MOTOR

The present invention relates in general to a power supply system for a linear motor. In particular, the invention is directed to an improvement of a power supply apparatus for a so-called long stator type linear motor such as a linear synchronous motor and the like for driving a vehicle, which motor comprises an armature coil (or propelling coil) laid on along a stationary track of the vehicle and a field system which is mounted on the vehicle.

There are known various applications of the long stator type linear motor mentioned above. Above all, application of the long stator linear motor to the ultra-high speed railway system developed recently is well known. In the case of the linear synchronous motor, the armature coil is disposed along the track, while in a linear induction motor, the primary coil is installed along the track. In an effort to improve the power supply efficiency, the armature coil or the primary coil (hereinafter, the long stator coil installed along the track is referred to as the propelling coil) is usually divided into sections of an appropriate length, wherein the sectioned propelling coils are supplied with electric power from a power converter apparatus (such as inverter and cyclo-converter, for example) through well known mechanical switches or static type switches constituted by thyristors, whereby the vehicle is caused to run along the track under the propelling force produced through electromagnetic action between the travelling or moving field generated by the propelling coil and the field system or reaction plates installed on the body of the vehicle. There are imposed on the power supply system for the long stator type linear motor including the divided or sectioned propelling coils such requirements as mentioned below.

(a) Variation in the propelling force should be suppressed to minimum when the vehicle runs along a track section defined by the adjacent propelling coil units.

(b) Variation in power at the input side of the power converter should be suppressed as small as possible when the vehicle runs across the adjacent propelling coil units.

(c) The power supply system should be implemented inexpensively.

Figure 1A:
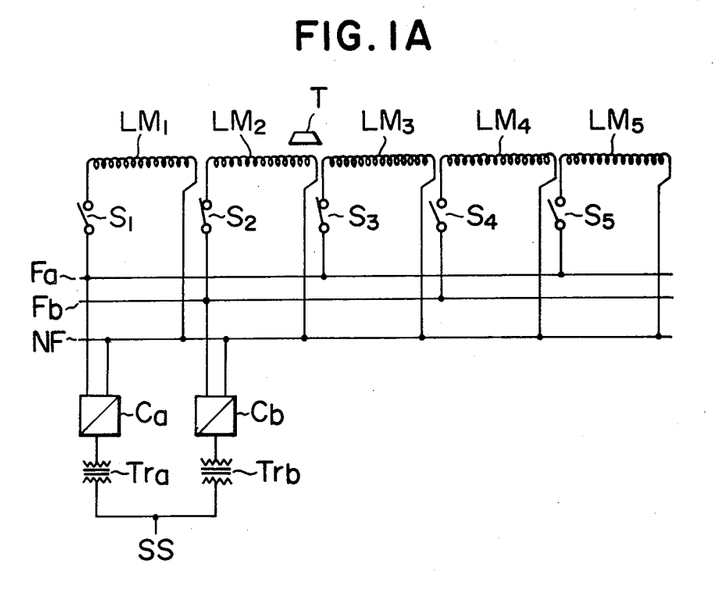
FIG. 1A is a circuit diagram showing an example of hitherto known power supply systems for a long stator linear motor.

As the power supply system for the linear motor which is designed to meet the requirements mentioned above, there is known for practical application a power supply apparatus shown in FIG. 1A of the accompanying drawings (reference is to be made to Japanese Patent Publication No. 23402/1979, FIG. 9). In the following, structure and operation of this known power supply system will be briefly elucidated to thereby make clear the problems to be solved by the invention.

Referring to FIG. 1A which shows schematically a circuit arrangement for a single phase of a power supply system for a three-phase linear motor, reference symbols $LM_1$, $LM_2$, ..., $LM_5$ denote, respectively, the divided propelling coil units which are sequentially connected to feeders $F_a$ and $F_b$ alternately through switches $S_1$, $S_2$, ..., $S_5$, respectively.

When a vehicle represented by T is at the position shown in the figure, both the switch $S_2$ associated with the propelling coil unit $LM_2$ at which the vehicle T is located at that moment and the switch $S_3$ for the propelling coil unit $LM_3$ corresponding to the section which the vehicle T is to enter in succession are closed, whereby the propelling coil unit $LM_2$ is supplied with electric power from a power converter $C_b$. When the vehicle T begins to enter the section corresponding to the propelling coil unit $LM_3$, another power converter $C_a$ which has been in the standby state is activated to initiate the power supply to the propelling coil unit $LM_3$. No sooner the vehicle T has left the propelling coil unit $LM_2$ and entered the region of the propelling coil unit $LM_3$ completely than the power converter $C_b$ operated until then is de-activated with the switch $S_2$ being opened, while the switch $S_4$ for the propelling coil unit $LM_4$ which the vehicle T is to enter next is beforehand closed with the power converter $C_b$ being set to the standby state. The above operations are repeated in the similar manner to cause the vehicle to run continuously.

Figure 1B:
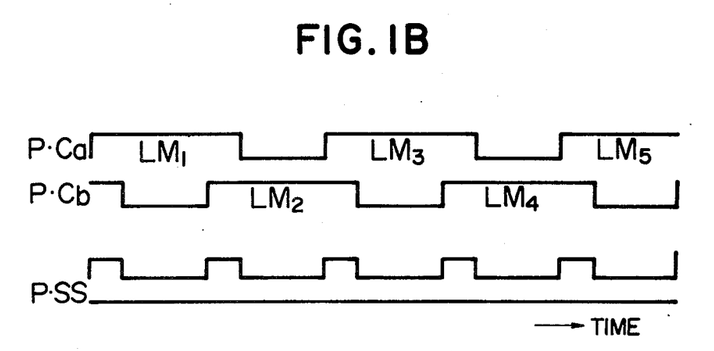
FIG. 1B shows waveform diagrams to illustrate operations of the power supply system shown in FIG. 1A.

With the power supply system described above, the vehicle is incessantly subjected to a propelling force. Since the two adjacent propelling coil units across which the vehicle is moving are supplied with power from the respective power converters $C_a$ and $C_b$ independent of each other, there will occurs no variation in the propelling force, to advantage. However, it is noted that apparent powers $P.C_a$ and $P.C_b$ of power receiving transformers $T_{ra}$ and $T_{rb}$ as well as the total apparent power $P.SS$ appearing at a power receiving point SS undergo periodic variations with the total apparent power $P.SS$ being increased during a period in which both the power converters $C_a$ and $C_b$ are operated simultaneously, as can be seen from waveform diagrams illustrated in FIG. 1B. Such variation in the apparent powers can be explained by the fact that excitation of the two adjacent propelling coil units involves an increase in the reactive power.

Figure 2A:
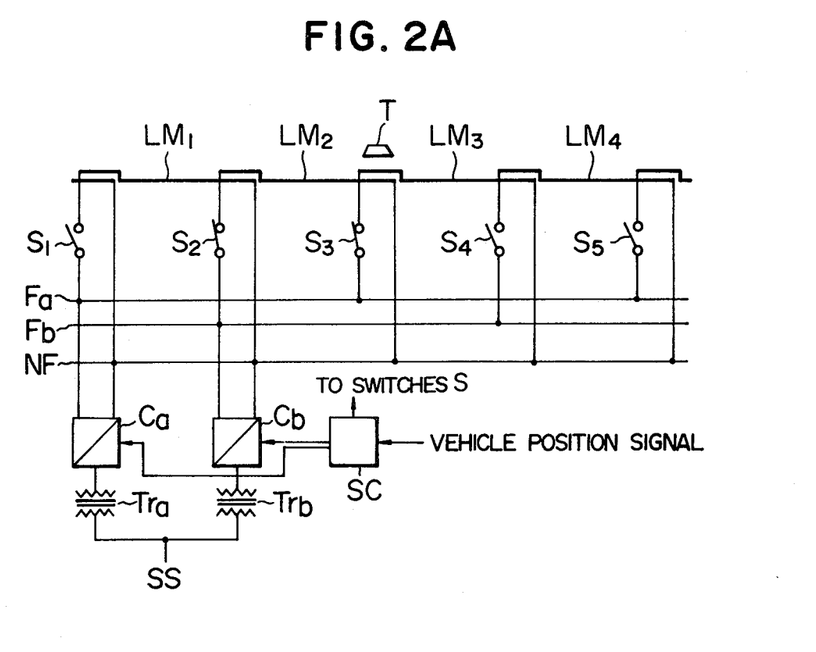
FIG. 2A shows in a circuit diagram another example of the hitherto known power supply systems for the long stator linear motor.
Figure 3A:
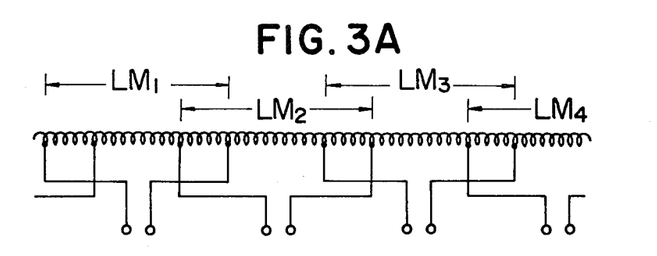
FIGS. 3A and 3B are circuit diagrams showing still another example of the hitherto known long stator linear motor system.

As approaches for reducing variation in the apparent power which occurs at the time when the vehicle is running across the two adjacent propelling coil units, there have been proposed a power supply system shown in FIG. 2A of the accompanying drawings (also refer to Japanese Patent Publication No. 32086/1980) and another power supply system shown in FIG. 3A (reference is to be made to Japanese Patent Laid-Open No. 18013/1976). In FIGS. 2A and 3A, same reference symbols are used to denote like or same components as those shown in FIG. 1. Accordingly, repeated description of the individual components will be unnecessary.

Figure 2B:
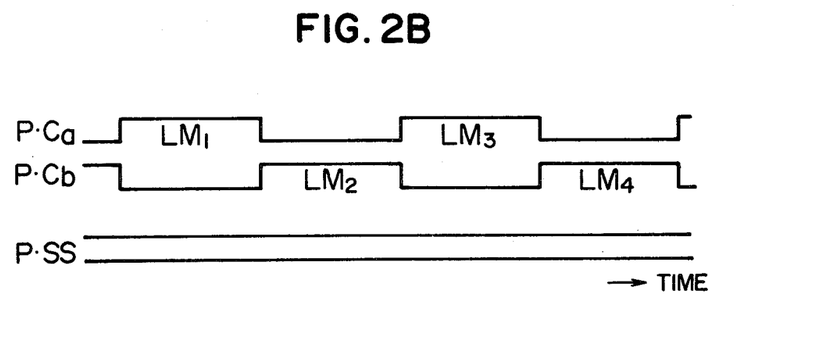
FIGS. 2B and 2C show waveform diagrams to illustrate operations of the power supply system shown in FIG. 2A.
Figure 2C:
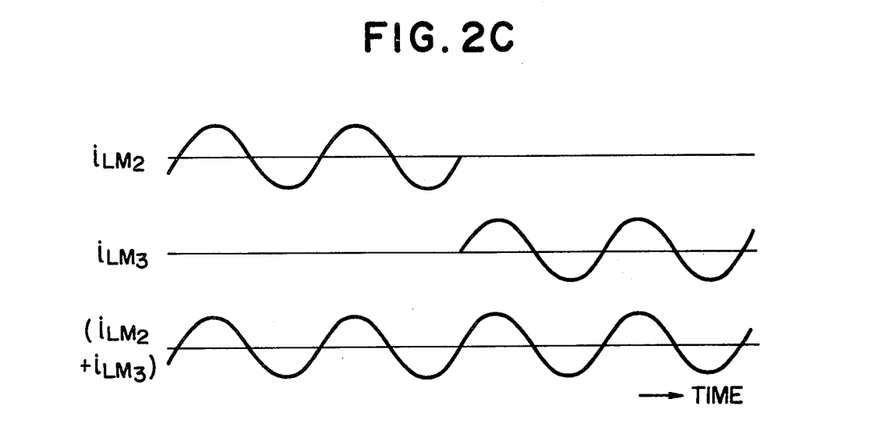
Figure 2D:
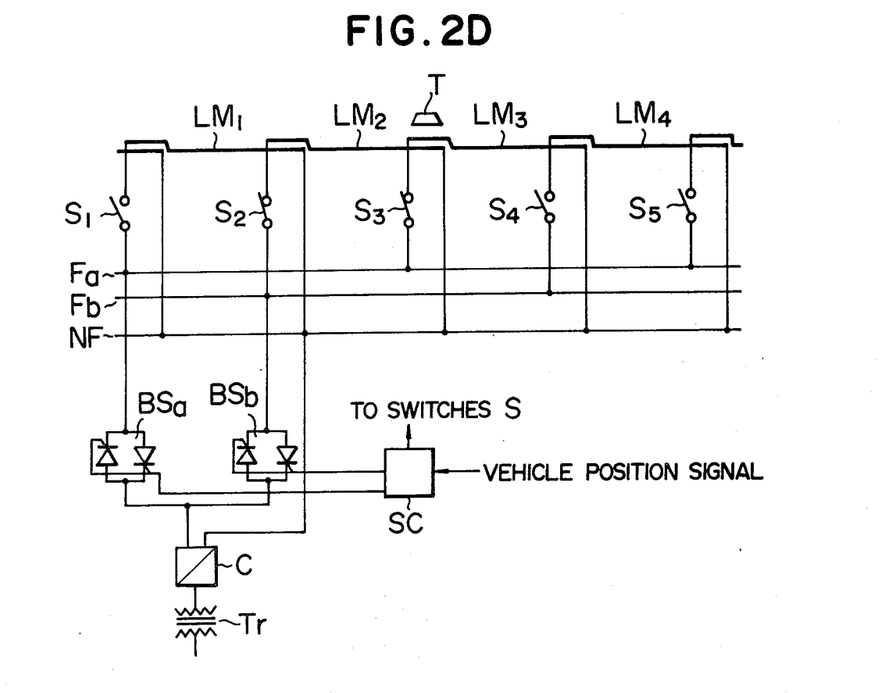
FIG. 2D shows in a circuit diagram a modification of a circuit portion including power converters in the power supply system shown in FIG. 2A.

In the power supply system shown in FIG. 2A, the propelling coil units positioned adjacent to each other are disposed so as to be partially superposed each other by a length greater than the effective length of the vehicle (e.g. total length of the field system mounted on the vehicle in the case of the linear synchronous motor). At the time point at which the vehicle comes to be positioned above the superposed section as is illustrated in FIG. 2, the power converter $C_b$ which has supplied power to the propelling coil unit $LM_2$ until then is instantaneously changed over to the power converter $C_a$, whereby the vehicle can receive the propelling force successively from the propelling coil unit $LM_3$ without interruption. A power supply switching control apparatus SC is provided to control the closing and opening of a group of switches S and the change-over between the power converters $C_a$ and $C_b$ on the basis of a signal representative of the position of the vehicle. When the power converter is constituted by a cyclo-converter or inverter composed of thyristors, the change-over of the power converters can be easily accomplished in a manner illustrated by waveform diagrams of FIG. 2C. More specifically, operation of the power converter $C_b$ is stopped at the time point at which the polarity of a current $i_{LM2}$ flowing through the propelling coil unit $LM_2$ is changed, while the power converter $C_a$ is simultaneously activated to thereby supply a current $i_{LM3}$ to the propelling coil unit $LM_3$. In case each of the power converters is composed of thyristors, activation and deactivation of the power converter can be easily accomplished by applying turn-on and turn-off signals to the gate electrodes of the thyristors in the manner well known in the art. Accordingly, the currents supplied to the propelling coil units $LM_2$ and $LM_3$ in succession may be regarded as being continuous, as can be seen from a current waveform ($i_{LM2}+i_{LM3}$) shown in FIG. 2C, involving no variation in the propelling force acting on the vehicle. Further, no variation occurs in the receiving apparent power P.SS, as is illustrated in FIG. 2B. It should here be mentioned that when the power supply to the propelling coil units is changed over in the manner mentioned above, it is not always necessary to provide the power converters in a pair, but provision of a single power converter will be sufficient by adopting such a circuit arrangement in which the output power from the single power converter is coupled alternately to the feeders $F_a$ and $F_b$ by means of branching switches $BS_a$ and $BS_b$, the switching of which is controlled by the aforementioned power supply switching control apparatus SC, as is shown in FIG. 2D. For more details, reference is to be made to Japanese Patent Publication No. 32086/1980, FIG. 6A.

However, the power supply systems shown in FIGS. 2A and 2D are disadvantageous in that the installation of the propelling coils involves high expenditure and complicated procedures, because the adjacent coils have to be superposed onto each other by a length greater than that of the vehicle body.

In an attempt to eliminate the disadvantages of the power supply systems described above, there is also known a power supply system shown in FIG. 3A in which a continuous propelling coil is electrically sectioned into a number of the propelling coil units $LM_1$, $LM_2$, $LM_3$, $LM_4$ and so forth by means of lead-out conductors so that the coil units disposed adjacent to each other share a common coil portion of a length greater than that of the vehicle body. When the vehicle is located at the region corresponding to the common or shared coil portion of the propelling coil units $LM_1$ and $LM_2$, for example, the power supply is changed over in such a manner in which the coil unit $LM_1$ is first energized, being followed by energization of the propelling coil unit $LM_2$, as is in the case of the aforementioned power supply systems.

Figure 3B:
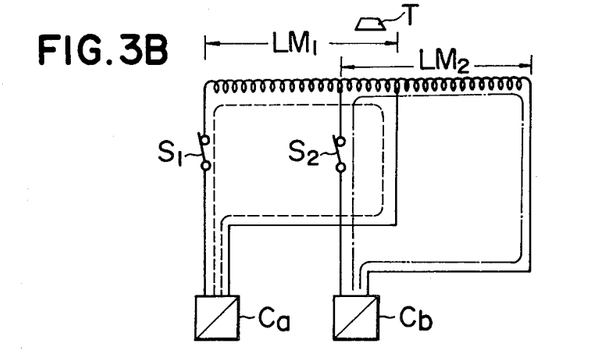

FIG. 3B shows a power supply circuit realized in a configuration similar to the one illustrated in FIG. 2A in the assumed case where the propelling coil is composed of two coil units. At the instant the vehicle T enters the common coil portion of the two adjacent propelling coil units $LM_1$ and $LM_2$, power supply is changed over so that the power converter $C_a$ which has been operated until then is deenergized, while the power converter $C_b$ is simultaneously activated, as is illustrated by a single-dot broken line loop. There arise no problems so far as the number of the propelling coil units as provided is two.

Figure 3C:
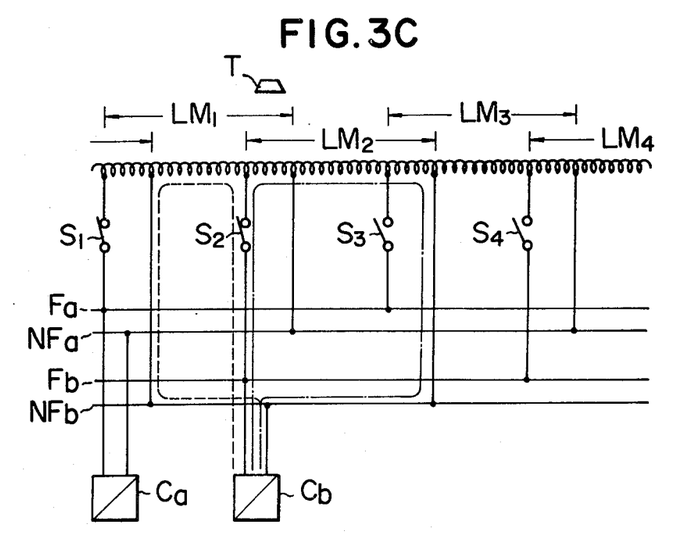
FIG. 3C shows a circuit diagram of a power supply system for the long stator linear motor shown in FIGS. 3A and 3B to elucidate the problems which the power supply system suffers.

However, the power supply circuit of the type similar to the one mentioned just above and destined to supply electric power to three or more propelling coil units, as is in the usual case, suffers a problem remaining to be solved. A typical example of the power supply circuit in question is shown in FIG. 3C. Referring to this figure, it is assumed that the vehicle is currently positioned over the common coil portion shared by the propelling coil units $LM_1$ and $LM_2$, wherein operation of the power converter $C_a$ is stopped while operation of the power converter $C_b$ has just been triggered. In this case, the current fed from the power converter $C_b$ flows not only along the current path extending through the propelling coil unit $LM_2$ as indicated by a single-dotted broken line but also along a shunting current path extending through a coil portion of the propelling coil unit $LM_1$ at which the vehicle is no more present, as indicated by a broken line. This means that the current of predetermined magnitude does not flow through the propelling coil unit at which the vehicle is present at the moment, eventually decreasing the propelling force, while loss is increased because of the useless current flow.

As will be obvious from the above description, when the propelling coil is electrically divided or sectioned in the manner shown in FIG. 3A with the propelling coil units and the power converters being interconnected in the manner shown in FIG. 3C similarly to the case where power is supplied to the propelling coil units which are physically and partially superposed onto one another between the adjacent ones as shown in FIG. 2A, there will arise decreases and variations in the propelling force to which the vehicle is subjected.

An object of the present invention is to provide a power supply system for a long stator linear motor in which a plurality of propelling coil units are electrically connected in series to one another in succession and sectioned into the coil units by means of lead-out conductors and which system is capable of changing over the power supply in succession to the individual propelling coil units in a very stable manner without incurring reduction in the propelling force and other disadvantages due to the aforementioned shunt current flow.

In view of the above object, there is provided according to an aspect of the present invention a power supply system for a long stator linear motor in which a continuous propelling coil is sectioned into a plurality of propelling coil units by means of lead-out conductors so that each pair of the propelling coil units disposed adjacent to each other have a common or shared coil portion of a length at least equal to that of a vehicle to be driven by the long stator linear motor and are supplied with electric power from power converters, and which comprises switch means each inserted in a current feeding path and a current return path formed, respectively, between each of the propelling coil units and each of the power converters so that only the single propelling coil unit is connected to one of the power converters without forming any shunt circuit, to thereby solve the problems brough about by formation of the shunt circuit in the hitherto known power supply systems described hereinbefore.

The present invention will be apparent from the following detailed description taken in conjunction with the accompanying drawings, in which.

Figure 4A:
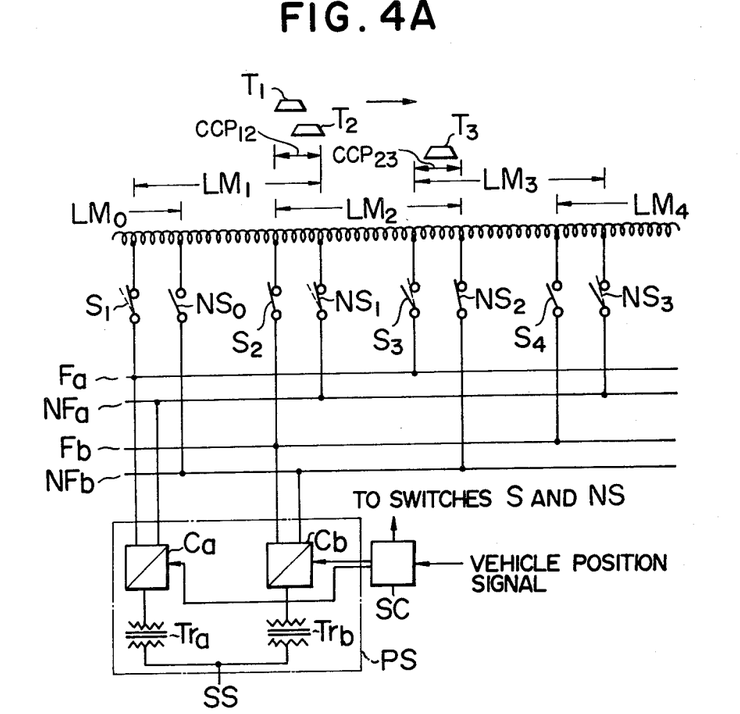
FIG. 4A is a schematic circuit diagram showing a circuit arrangement for one phase of a power supply system for a three-phase long stator linear motor to illustrate the principle of the present invention.
Figure 4B:
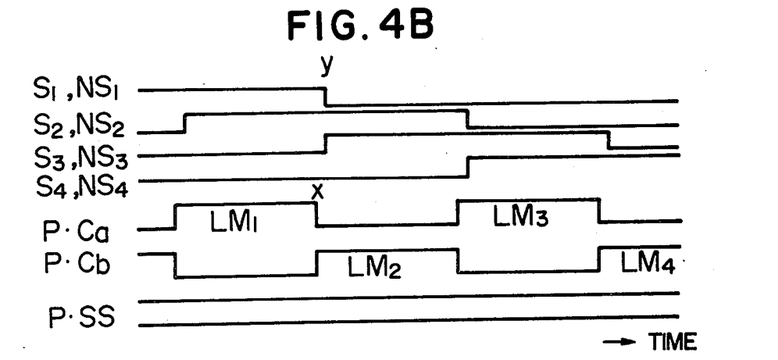
FIG. 4B shows waveform diagrams to illustrate operations of the power supply system shown in FIG. 4A.

Now, exemplary embodiments of the present invention will be described in detail by first referring to FIG. 4A which schematically shows a general circuit configuration of the power supply system for a long stator linear motor according to an embodiment of the invention to illustrate the principle thereof and FIG. 4B showing waveform diagrams to illustrate operations of the power supply system shown in FIG. 4A.

Referring to FIG. 4A in which the power supply circuit is shown for one phase of a three-phase long stator linear motor, a propelling coil which constitutes the long stator of the linear motor and laid on along a track of a vehicle driven by the linear motor is sectioned into a plurality of propelling coil units $LM_1$, $LM_2$, $LM_3$ and so forth by means of lead conductors in such a manner that the propelling coil units located adjacent to each other have in common a coil portion which is shared by ($CCP_{12}$, $CCP_{23}$ and so forth) them and has a length not smaller than an effective length of the 1 vehicle. The lead conductors are connected to feeders through respective switches. More specifically, in the case of the illustrated example, the propelling coil units denoted by attaching odd-numbered suffixes, i.e. $LM_1$, $LM_3$ and so forth, have one lead conductors connected to the feeder $F_a$ through switches $S_1$, $S_3$ and so forth, respectively, and other lead conductors connected to the feeder $NF_a$ through switches $NS_1$, $NS_3$ and so forth, respectively. On the other hand, the even-numbered propelling coil units $LM_2$, $LM_4$ and so forth have one lead conductors connected to the feeder $F_b$ through switches $S_2$, $S_4$ and so forth, respectively, and other lead conductors connected to the feeder $NF_b$ through switches $NS_2$, $NS_4$ and so forth, respectively. The odd-numbered propelling coil units $LM_1$, $LM_3$ and so forth are adapted to be supplied with electric power from a power converter $C_a$, while the even-numbered propelling coil units are energized by a power converter $C_b$. Activation and deactivation of the power converters $C_a$ and $C_b$ as well as alternate turn-on/off of the switches $S_1$; $NS_1$, $S_2$; $NS_2$ and so forth are controlled by a power supply switching controller SC in dependence on the instantaneous position of the vehicle. Operations of the power supply system shown in FIG. 4A will be described below with the aid of the waveform diagrams shown in FIG. 4B.

Referring to FIG. 4A, it is first assumed that the vehicle denoted generally by a reference letter T is located at a position represented by $T_1$. In this state, the switches $S_1$ and $NS_1$ of the propelling coil unit $LM_1$ have already been closed, whereby the vehicle T is being driven under the propelling force exerted by the propelling coil unit $LM_1$ being at the moment energized by the power converter $C_a$. Here, it should be noted in conjunction with the signal waveform diagrams labelled with $S_1$, $NS_1$, etc. that high level of a signal represents the closed or "ON" state of the associated switch, while the low level represents the opened or "OFF" state of the same. The switches $S_2$ and $NS_2$ of the propelling coil unit $LM_2$ to be energized in succession are in the closed or "ON" state, while the power converter $C_b$ is deactivated and thus is in the standby state ready for being activated. The switches for all the other coil units are in the "OFF" state.

During a period in which the vehicle T is running along the common coil portion or section shared by two given adjacent propelling coil units, e.g. from the vehicle position $T_1$ at which the vehicle T has completely entered the section corresponding to the coil unit $LM_2$ to the position $T_2$ immediately before the vehicle begins to leave or exit from the propelling coil unit $LM_1$, as shown in FIG. 4A, the power converter $C_a$ is deactivated, while the power converter $C_b$ is activated simultaneously with the deactivation of the converter $C_a$, to thereby change over the power supply to the propelling coil unit $LM_2$ from the coil unit $LM_1$ at a time point denoted by x in FIG. 4B. It is most desirable that the above mentioned change-over of the power supply between the adjacent propelling coil units be effected at zero current points with a view to suppressing variations in the propelling force as well as transient variations in power to the possible minimum, as described hereinbefore in conjunction with FIG. 2C.

After the change-over of the power supply mentioned above, the power converter $C_a$ remains deactivated until the next change-over operation. Accordingly, during a period in which the power converter $C_a$ is deactivated, the switches $S_1$ and $NS_1$ which have been closed until then are opened, while the switches $S_3$ and $NS_3$ of the propelling coil unit $LM_3$ which the vehicle T is to enter in succession are closed to thereby prepare the power supply path or circuit for the propelling coil unit located in succession as viewed in the travelling direction of the vehicle T at a time point y shown in FIG. 4B. However, the switching (i.e. opening and closing) of the associated switches may be effected only before the succeeding change-over of the power supply is to take place. The opening and closing of all these switches can be effected in the no-current state. In this connection, it is preferred that the opening of the switches $S_1$ and $NS_1$ or more generally $S_i$ and $NS_i$ where i is a given integer would be effected at different time points for the reason mentioned below. Since these switches $S_i$ and $NS_i$ are opened after the operation of the power converter $C_a$ has been stopped, it may appear that the opening of these switches $S_i$ and $NS_i$ at different time points would be meaningless. However, consideration should also be paid to the fact that these switches might be opened in the current flowing state due to failures in the controller or for other causes. In such case, both of the switches $S_i$ and $NS_i$ must have a capability of breaking the load current, when they are to be opened simultaneously. Under the circumstances, it is desirable that either of the switch $S_i$ or $NS_i$ be opened in precedence to the other, because then only one of the switches $S_i$ and $NS_i$ needs to be imparted with the load current breaking capability (i.e. the capability of breaking the load current upon occurrence of failure, even if it is rare), while the other switch need not have such capability. Then, the burden imposed on the switches $S_i$ and $NS_i$ can be balanced as a whole, whereby not only the costs required for these switches can be remarkably reduced but also the reliability as well as facility of maintenance of the switch system can be enhanced significantly.

When the vehicle T comes to a position $T_3$ at which the vehicle T has entered a region corresponding to the common coil portion shared by the propelling coil units $LM_2$ and $LM_3$, the power supply is changed over from the coil unit $LM_2$ to the coil unit $LM_3$, while the current feeding paths to the succeeding propelling coil unit $LM_4$ as viewed in the traveling direction of the vehicle T is prepared by opening and closing the associated switches in the manner described above. Similar procedure is repeated to cause the vehicle to run continuously. It will be seen from FIG. 4B that the input apparent powers $P.C_a$ and $P.C_b$ of the power converters $C_a$ and $C_b$ are such as represented by the signal waveforms $P.C_a$ and $P.C_b$, respectively, resulting in that the total apparent power, that is the apparent power P.SS received by the whole power converter apparatus PS scarcely undergoes variation, as can be seen in the signal waveform P.SS in FIG. 4B.

In this way, when the propelling coil unit $LM_3$, for example, is being supplied with power through the power converter $C_a$, the switch $NS_1$ inserted in the current return path of the coil unit $LM_3$ has been opened (in reality, this switch $NS_1$ was opened at the time point when the propelling coil unit $LM_1$ had been deenergized). Accordingly, there can be positively excluded the possibility of such a shunt current path as indicated by the broken line loop in FIG. 3C being formed extending through a part of the other propelling coil unit at which the vehicle is not present.

Of course, it goes without saying that the switches $S_i$ and $NS_i$ can be closed and opened in the no-current state.

Figure 5:
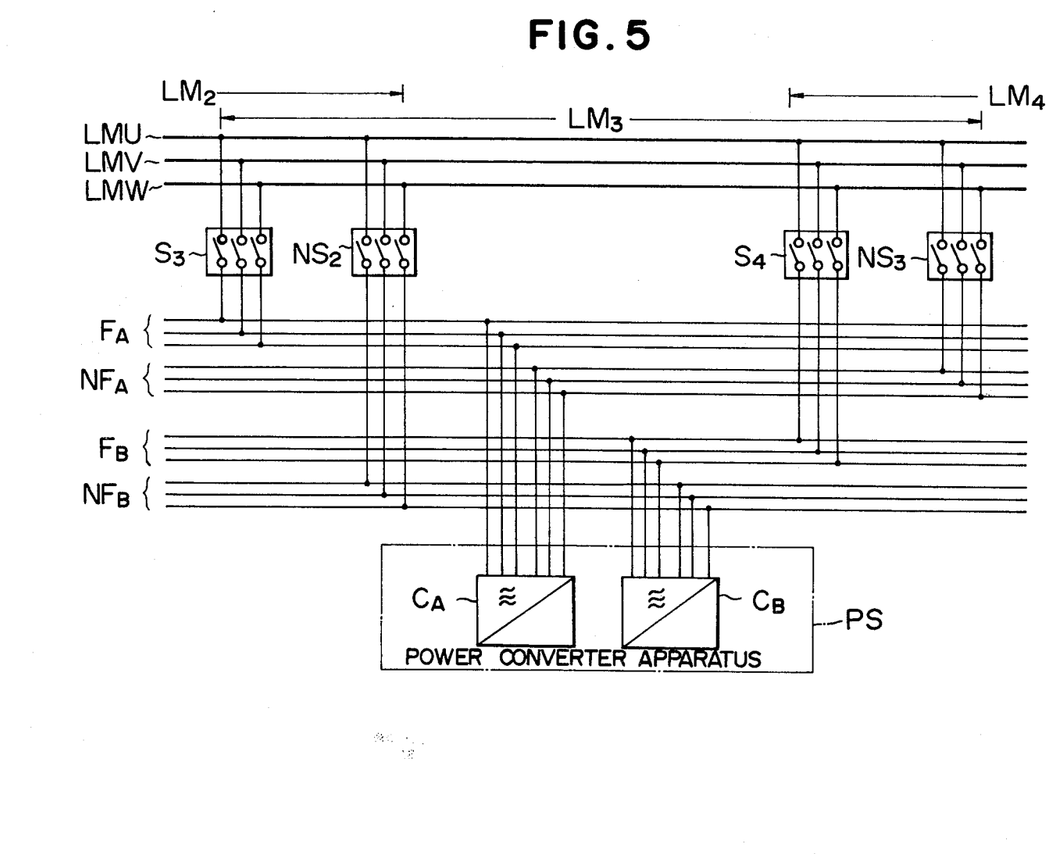
FIG. 5 shows schematically a circuit arrangement of the power supply system of FIG. 4A for all the three phases.

As described hereinbefore, FIG. 4A shows the power supply circuit arrangement for the only one phase. In practice, the power supply circuit may be realized in such a configuration as shown in FIG. 5 for a three-phase linear motor. In FIG. 5, the propelling coils LMU, LMV and LMW each provided for each phase of the three-phase system are depicted in thick solid lines. The switches, the feeders and the power converters are provided so as to correspond with the three-phase system. Arrangement of these components for the one phase is identical with what is shown in FIG. 4A.

Figure 6A:
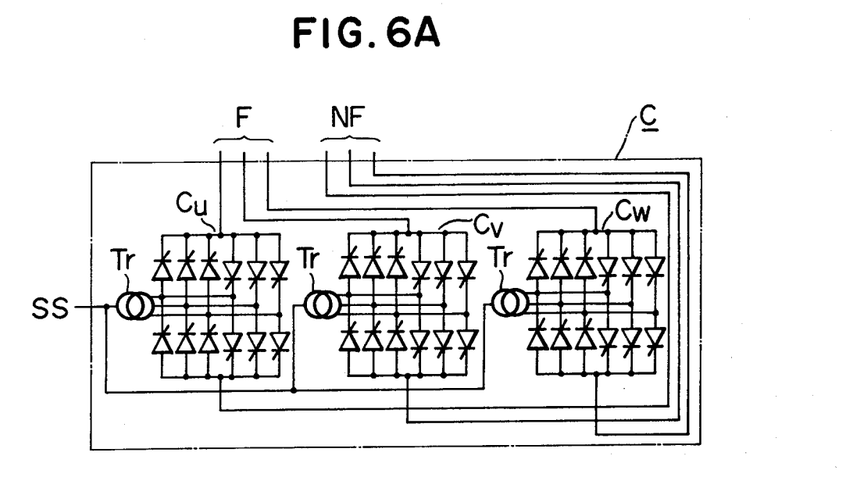
FIGS. 6A and 6B show circuit arrangements of a power converter which can be employed in the power supply system shown in FIG. 5A according to an exemplary embodiment of the invention.

FIG. 6A shows an exemplary arrangement of the three-phase power converter circuit for the three-phase system shown in FIG. 5. The power converter circuit shown in FIG. 6A is composed of a three-phase cycloconverter C constituted by three single-phase cycloconverters $C_U$, $C_V$ and $C_W$ and has one output terminals connected to the feeders F and the other connected to the feeders NF, to thereby provide the power supply source circuit for the three-phase linear motor.

Figure 6B:
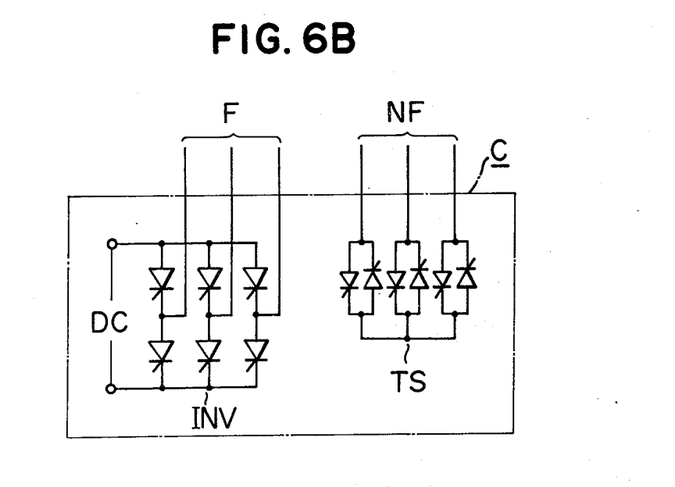

In contrast to FIG. 6A, FIG. 6B shows an exemplary power supply converter circuit in which a conventional three-phase inverter INV having no neutral point is made use of as the power converter. In this case, it is required to provide a thyristor switch circuit TS which can be turned on and off in synchronism with activation and deactivation of the three-phase inverter INV for the purpose of providing a neutral point for the three-phase propelling coil units. More particularly, in the case of the power supply systems described hereinbefore in conjunction with FIGS. 1A and 2A, the neutral point of the propelling coil units in the three-phase connection can be formed without any difficulty merely by connecting the current return paths of these three-phase propelling coil units directly to the current return feeder without inserting the return path switches NS shown in FIG. 4A. However, it will readily be understood from the three-phase power supply circuit diagram shown in FIG. 5 that the mere connection of all the feeders NF for the current return paths at a single point will give rise to a problem mentioned below. Namely, assuming that the power supply is changed over from the propelling coil unit $LM_3$ to the $LM_4$ during a period in which the vehicle T is running along the common coil portion shared by these coil units $LM_3$ and $LM_4$, then the switches $NS_3$, $S_4$ and $NS_4$ (not shown) are closed while all the other switches are opened. Up to a time point immediately before the power supply is to be changed over as described above, the propelling coil unit $LM_3$ is energized by way of a current path which extends from the power converter $C_A$ to the neutral point located within it through the switch $S_3$, the propelling coil unit $LM_3$ and the return path switch $NS_3$. Starting from this state, the power supply is transferred to the propelling coil unit $LM_4$ by activating the power converter $C_B$ while deactivating the converter $C_A$. However, since the neutral point is formed within the power converter which is connected to the return path switch unit $NS_3$, the current supplied from the power converter $C_B$ will flow through a local current path extending from the converter $C_B$ to the neutral point within it through a part of the propelling coil unit $LM_4$ and the return path switch $NS_3$ instead of flowing through the whole propelling coil unit $LM_4$ in the case where the three phases are combined together at the single point. For the current to be caused to flow through the whole propelling coil unit $LM_4$ by any means, it is required to open the return path switch $NS_3$, which in turn means that the return path switch $NS_3$ has to be imparted with the current breaking capability and that the propelling force acting on the vehicle undergoes variation in correspondence to the variation in the current flowing through the propelling coil unit $LM_4$. In the light of the above, it is desirable to form the neutral point by using the thyristor switch unit TS when the conventional three-phase inverter having no neutral point is employed as the power supply converter for the three-phase linear motor system. In this case, when the power supply is to be changed over from the propelling coil unit $LM_3$ to $LM_4$, the power converter $C_A$ is deactivated by applying a turn-off signal to the inverter INV and the gate of the thyristor switch unit TS while the power converter $C_B$ is activated by applying a turn-on signal to the associated inverter INV and the gate of the thyristor switch. Since the power converter $C_A$ is opened at the side connected to the return path switch $NS_3$, the current supplied from the power converter $C_B$ can flow along a path extending from the inverter INV of the power converter $C_B$ through the switch $S_4$, the propelling coil unit $LM_4$ and the return path switch $NS_4$ (not shown) to the thyristor switch TS of the power converter $C_B$.

Figure 7A:
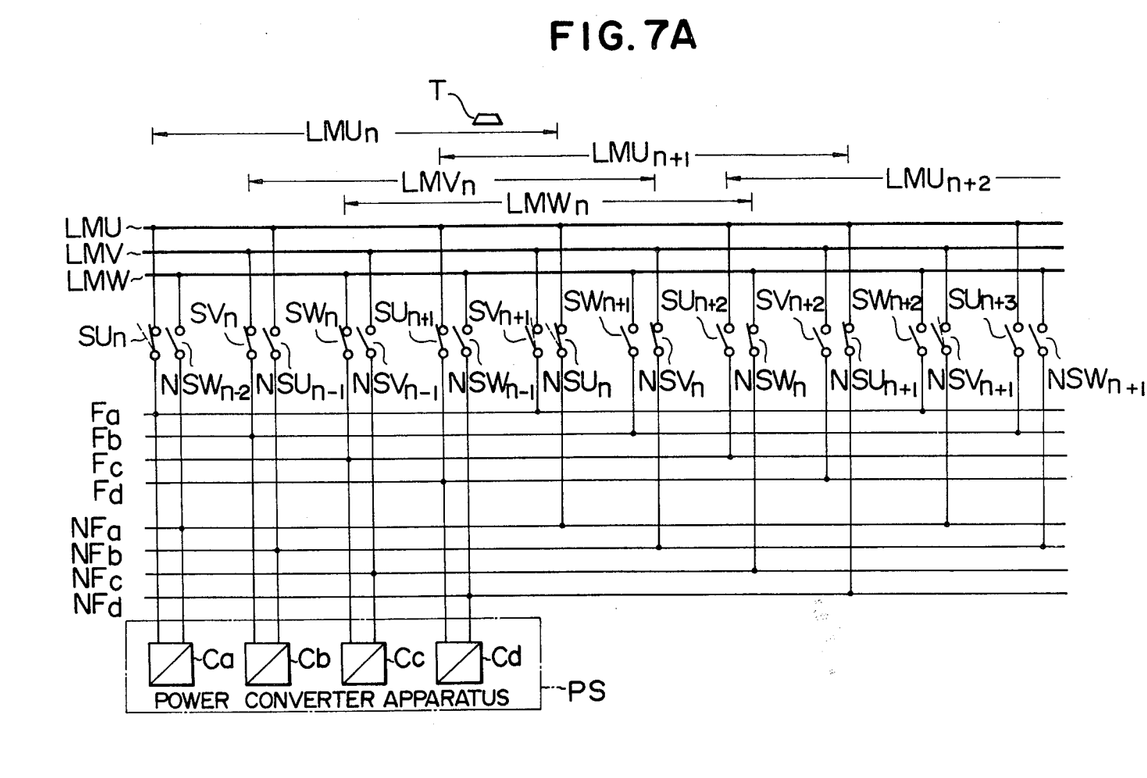
FIG. 7A is a schematic circuit diagram of the power supply system for a long stator linear motor according to another embodiment of the invention.

FIG. 7A shows another embodiment of the invention in which coil sections constituting the three-phase propelling coil unit are positionally shifted or offset from one another for U-, V- and W-phases. It is known from the Japanese Patent Publication No. 14603/1980 that the power supply system for a three-phase linear motor is so constituted that the phase coil sections of each of the propelling coil units are positionally shifted or offset from one another for the purpose of decreasing the number of the individual thyristor power converters which constitute the power converter apparatus. In the case of the embodiment shown in FIG. 7A, the teaching disclosed in the above cited Japanese Patent Publication is applied to the power supply system for the propelling coil units connected in series as shown in FIG. 5. Now, description of the power supply system shown in FIG. 7A will be made in detail.

The propelling coil units $LMU_n$, $LMV_n$ and $LMW_n$ belonging to the n-th coil section of the propelling coils LMU, LMV and LMW of a three-phase linear motor are disposed as offset from one another by a length not smaller than the effective length of a vehicle to be driven by the three-phase linear motor, wherein the propelling coil units located adjacent to each other in the same phase propelling coil such as $LMU_n$ and $LMU_{n+1}$, for example, are so defined or sectioned by means of the lead wires that a coil portion of a length greater than the effective length of the vehicle is shared in common between these adjacent coil units of the same phase. The propelling coil units $LMU_n$, $LMV_n$, $LMW_n$, $LMU_{n+1}$ and so forth have one lead conductors connected sequentially and repeatedly to four going or incoming feeders $F_a$, $F_b$, $F_c$ and $F_d$ through switches $SU_n$, $SV_n$, $SW_n$, $SU_{n+1}$ and so forth, respectively, and other lead conductors connected sequentially and repeatedly to four return feeders $NF_a$, $NF_b$, $NF_c$ and $NF_d$ through the switches $NSU_n$, $NSV_n$, $NSW_n$, $NSV_{n+1}$ and so forth, respectively. The four sets of the feeders ($F_a$; $NF_a$), ($F_b$; $NF_b$), ($F_c$; $NF_c$) and ($F_d$; $NF_d$) each for one phase are connected to four power converters $C_a$, $C_b$, $C_c$ and $C_d$ each for one phase, respectively.

Figure 7B:
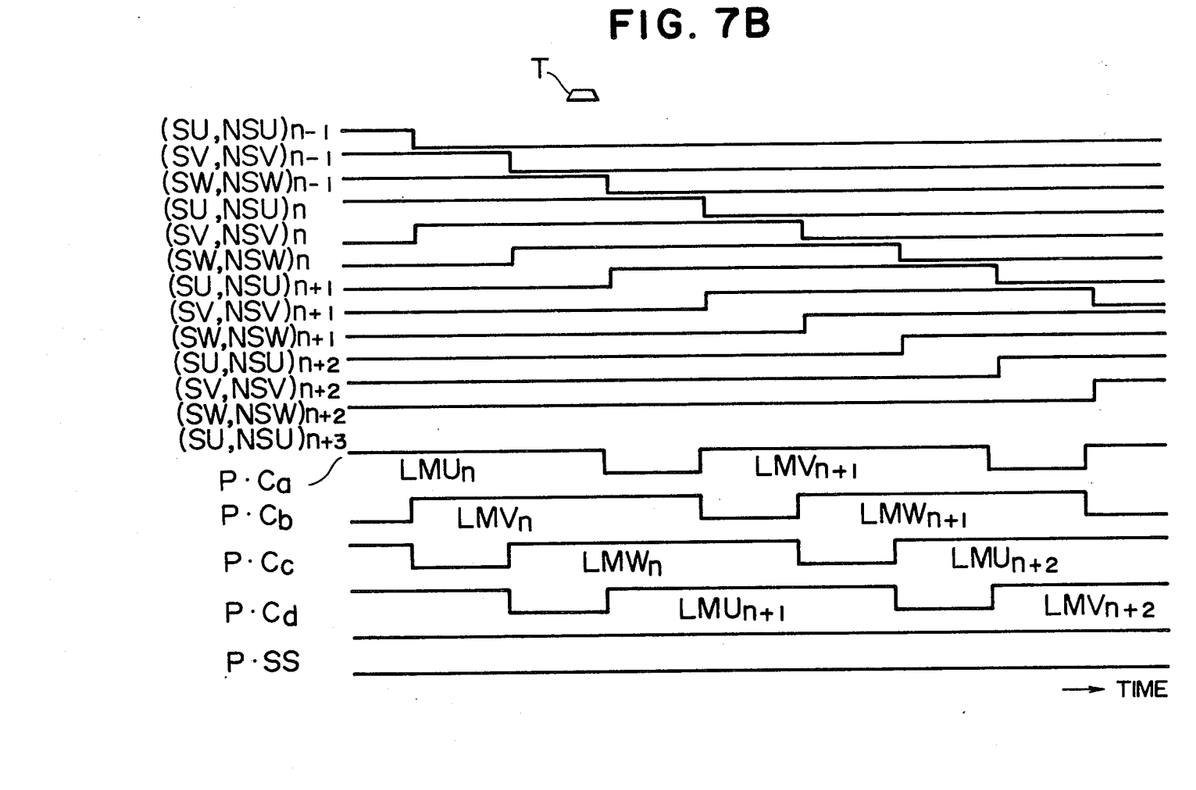
FIG. 7B shows waveform diagrams to illustrate operations of the power supply system of the linear motor shown in FIG. 7A.

Describing operations of the power supply system shown in FIG. 7A by also referring to the signal waveform diagrams shown in FIG. 7B, it is assumed that the vehicle T is located at the section corresponding to the common portion shared by the adjacent propelling coil units $LMU_n$ and $LMU_{n+1}$, as is shown in FIG. 7A. On the assumption, the switches are at the positions indicated by solid line bars, wherein the propelling coil unit $LMU_n$ of U-phase above which the vehicle is present at the moment is electrically energized from the power converter $C_a$ through the switches $SU_n$ and $NSU_n$, while the propelling coil unit $LMV_n$ of the V-phase is supplied with power from the power converter $C_b$ through the switches $SV_n$ and $NSV_n$, and the propelling coil unit $LMW_n$ of the W-phase is powered from the power converter $C_c$ through the switches $SW_n$ and $NSW_n$. In this state, the switches $SU_{n+1}$ and $NSU_{n+1}$ of the propelling coil unit $LMU_{n+1}$ to be supplied with power in succession have been already closed (after the preceding change-over of power supply). However, the power converter $C_d$ is not yet operated but in the standby state ready for being activated. When the power converter $C_a$ is deactivated with the power converter $C_d$ being activated starting from this state in the manner described hereinbefore in conjunction with FIG. 2C, the power supply can be changed over smoothly from the propelling coil unit $LMU_n$ to the coil unit $LMU_{n+1}$, whereby the vehicle can be driven or propelled continuously and smoothly.

In the new state mentioned just above, the power converter $C_a$ is deactivated, while the power converters $C_b$, $C_c$ and $C_d$ supply electric power to the propelling coil units $LMV_n$, $LMW_n$ and $LMU_{n+1}$, respectively. The next change-over of the power supply to be effected as the vehicle travels is from the propelling coil unit $LMV_n$ to the coil unit $LMV_{n+1}$. To this end, the switches $SU_n$ and $NSU_n$ are opened while the switches $SV_{n+1}$ and $NSV_{n+1}$ are closed as indicated by broken lines in FIG. 7A to thereby allow the connection of the deactivated power converter $C_a$ to be changed over from the propelling coil unit $LMU_n$ of the U-phase to the V-phase propelling coil unit $LMV_{n+1}$ (not shown).

In this way, the idle one of the four power converters is successively connected to the propelling coil units which come successively to the position to be immediately occupied by the travelling vehicle and which belongs to the phase of which the power supply is to be changed over. Changing-over of the various power converters as well as opening and closing of the associated switches mentioned above take place successively and repeatedly, as the vehicle travels, in the manner illustrated by the waveform diagrams shown in FIG. 7B, whereby the vehicle is allowed to run continuously and smoothly along the track defined by the three-phase propelling coil units connected in series and having three phase coil sections positionally shifted or offset relative to one another in the traveling direction of the vehicle. In connection with FIG. 7B, it should be added that an expression (SU, NSU)$_n$, for example, represents the switches $SU_n$ and $NSU_n$ in combination which serve to connect the U-phase propelling coil unit $LMU_n$ of the n-th section to the feeders and that high level of the signal waveform represents the closed state of the associated switches, while the low level represents the opened state of the associated switches. On the other hand, the waveforms P.$C_a$, ..., P.$C_d$ represent the operating states of the power supply converters $C_a$, ..., $C_d$, respectively, wherein the high level means that the concerned power converter is in the power supplying state, while the low level means that the converter is deactivated. Further, the reference letters $LMU_n$, $LMV_n$, $LMW_n$ and so forth inserted in the waveform diagrams P.$C_a$, ..., P.$C_d$, respectively, denote the propelling coil units which are being supplied with power from the power converters $C_a$, ..., $C_d$, respectively. The abscissa represents positions of the track. Finally, the waveform curve P.SS represents the total apparent power of all the four power converters at the input side thereof. As will be seen, no variation occurs in the total apparent power.

As will be appreciated from the above description, the three-phase power supply system illustrated in FIGS. 7A and 7B makes it possible to supply power to the three-phase propelling coil units alternately exchangeably without any appreciable variations in the power being supplied with the aid of as small a number as of four single-phase power converters.

Figure 8A:
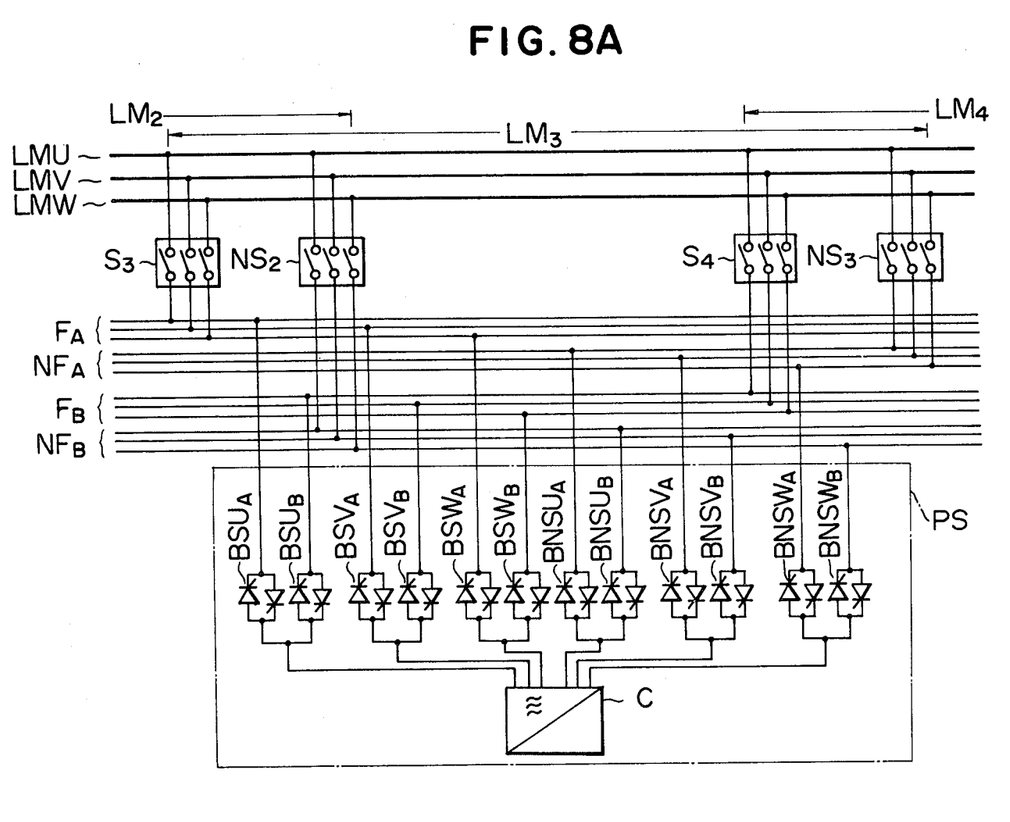
FIG. 8A shows in a schematic circuit diagram still another embodiment of the power supply system for the long stator linear motor according to the invention.
Figure 8B:
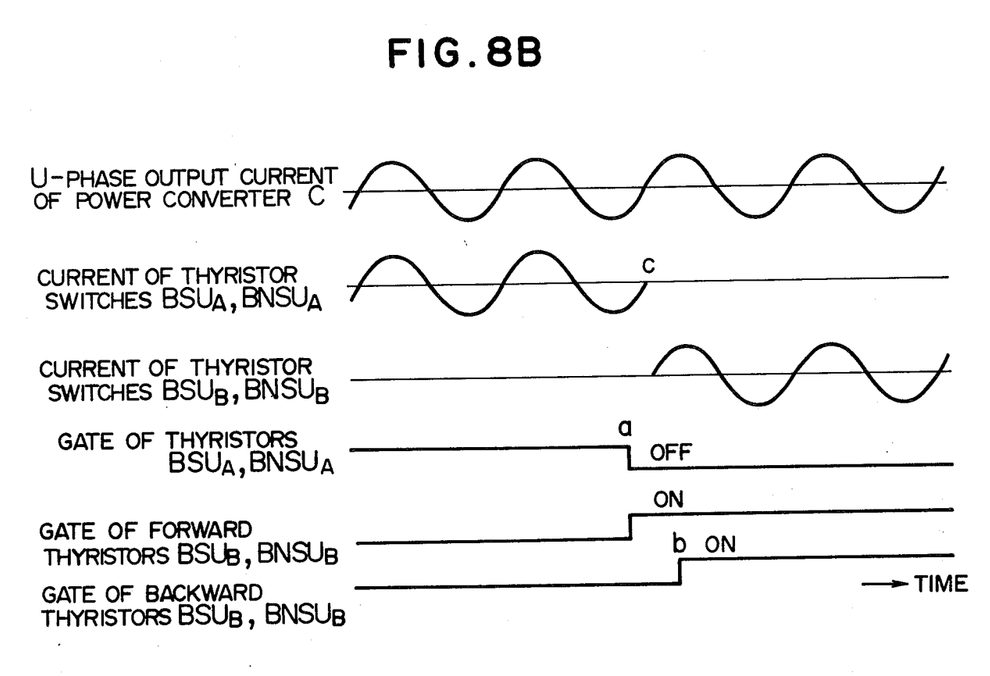
FIG. 8B shows waveform diagrams to illustrate operations of the system shown in FIG. 8A.

FIG. 8A shows another exemplary embodiment of the invention in which there is adopted a system for selectively and exchangeably conducting the output power of a single power converter by means of thyristor switches as shown in FIG. 2D is adopted. Referring to FIG. 8A, the power converter circuit PS is composed of a single three-phase power converter C, thyristor switches ($BSU_A$; $BSU_B$), ($BSV_A$; $BSV_B$) and ($BSW_A$; $BSW_B$) for conducting the output power of the three-phase power converter C to the going feeders $F_A$ and $F_B$, and thyristor switches ($BNSU_A$; $BNSU_B$), ($BNSV_A$; $BNSV_B$) and ($BNSW_A$; $BNSW_B$) for conducting the output power of the three-phase converter C to the return feeders $NF_A$ and $NF_B$. With such circuit arrangement, operations of the switches are effected in a similar manner as is in the case of the embodiment shown in FIGS. 4A and 5A. Change-overs between the thyristor switches between ($BSU_A$; $BNSU_A$) and ($BSU_B$; $BNSU_B$), between ($BSV_A$; $BNSV_A$) and ($BSV_B$; $BNSV_B$) and between ($BSW_A$; $BNSW_A$) and ($BSW_B$; $BNSW_B$) may be realized in a manner similar to the change-over between the power converters $C_A$ and $C_B$ shown in FIG. 5. FIG. 8B shows waveform diagrams to illustrate change-over operation for the U-phase. Assuming now that the vehicle has completely entered the common coil portion shared by the adjacent propelling coil units, the gates of the thyristor switches $BSU_A$ and $BNSU_A$ which have been conducting until then are turned off at a time point a shown in FIG. 8B, while the gates of the thyristors $BSU_B$ and $BNSU_B$ (referred to as forward thyristors for convenience's sake) connected with a polarity opposite to that of the output current of the power converter C (the polarity of the output current is negative in the case of the illustrated embodiment) are turned on. At a time point b at which the polarity of current is inverted, the change-over of the power supply takes place. More concretely, the thyristor switches $BSU_A$ and $BNSU_A$ whose gates are turned off become spontaneously non-conductive upon inversion of the current polarity, whereby the output current of the power converter C is changed over toward the thyristor switches $BSU_B$ and $BNSU_B$. Thereafter, the gates of these backward thyristors $BSU_B$ and $BNSU_B$ are turned on at a time point c. When the change-over among the thyristor switches for the U-, V- and W-phases have been completed, the switches $S_i$ and $NS_i$ (e.g. $S_3$ and $NS_3$ in the case of the illustrated embodiment) which have been closed until then are opened, while the switches (e.g. $S_5$ and $NS_5$ not shown) for the propelling coil units which have to be next energized for driving the vehicle are closed. In this manner, the change-over of the power supply to the three-phase propelling coil units are repeatedly performed as the vehicle travels further.

With the circuit arrangement shown in FIG. 8A, installation of a single power converter is sufficient for attaining the desired power supply operation in the three-phase power supply system, although provision of the thyristor switches are required.

As will be appreciated, there has been provided according to the present invention the power supply system for the long stator linear motor in which no current shunting path is formed when the power supply is changed over from one to another sectioned propelling coil units and in which the receiving or input power undergoes substantially no variations when the vehicle is running along the common coil portion shared by every adjacent propelling coil units. Thus, the power supply system for the linear motor according to the invention can assure comfortable ride in the vehicle with reduced expensiveness.

We claim:

1. A power supply system for a polyphase linear motor which includes a propelling coil disposed continuously along a track and sectioned into a plurality of propelling coil units for generating a moving magnetic field to drive a vehicle, comprising plural sets of feeders, a power converter apparatus connected to said feeders, a group of switch means arranged for connecting alternately said plurality of propelling coil units to said plural sets of feeders, and control means for changing over said switch means sequentially so that said propelling coil units are successively supplied with power, as said vehicle travels, wherein said plurality of propelling coil units are connected continuously in series to constitute said propelling coil and so defined by lead conductors that the propelling coil units disposed adjacent to each other have a common coil portion shared by them, each of said common coil portion extending for a length not smaller than an effective length of said vehicle;

each of said plural sets of feeders including a going feeder and a return feeder for each phase;

said switch means being constituted by first switches connected between one end of each of said propelling coil units and said going feeders, respectively, and second switches connected between the other end of each of said propelling coil units and said return feeders, respectively; and said power converter apparatus being so arranged that power supply to one set of said feeders is changed over to another set of said feeders when said vehicle is located at a region defined by said common coil portion to thereby change over the power supply from one of the adjacent propelling coil units to the other, said adjacent propelling coil units having said common coil portion along which said vehicle is running at that moment.

2. A power supply system according to claim 1, wherein said power converter apparatus includes a number of power converters corresponding to said plural sets of feeders, respectively.

3. A power supply system according to Claim 1, wherein said power converter apparatus includes a single power converter and switching means for exchangeably connecting the output of said power converter to said plural sets of feeders.

4. A power supply system according to claim 1, wherein said propelling coil units each provided for each phase are disposed as offset from one another by a length not smaller than the effective length of said vehicle, said power converter apparatus including single-phase power converters in number at least equal to the number of phases of said linear motor plus one and arranged in such a manner in which, when said vehicle is located at the region defined by the common coil portion of a given one of said phases, power supply from one of said single-phase power converters to the propelling coil unit of said given phase constituting a part of said common coil portion is changed over to power supply to the adjacent propelling coil unit of said given phase constituting the other part of said common coil portion from another single-phase power converter which is not activated at that moment.

5. A power supply system according to claim 1, wherein said power converter apparatus includes a poly-phase thyristor switch unit for forming a neutral point either for said going feeders or said return feeders.

6. A power supply system according to claim 1, wherein said power converter apparatus includes means for instantaneously changing over the power supply from one set of said feeders to other set of said feeders, when said vehicle is present at the region defined by said common coil portion and when the switch means associated with the adjacent propelling coil units sharing said common coil portion are in the closed state.

7. A power supply system according to claim 1, wherein said plurality of propelling coil units are directly connected in series to one another without interposition of insulation therebetween.

8. A power supply system according to claim 1, wherein said power converter apparatus includes means for changing over the power supply from one of the adjacent propelling coil units to the other adjacent propelling coil unit with substantially no variation in the power supplied to the adjacent propelling coil units.

9. A power supply system according to claim 1, wherein said control means controls the switching of said switching means at a time when current does not flow therethrough.

* * * * *